United States Patent
Sheets, Jr. et al.

(10) Patent No.: US 9,390,346 B1
(45) Date of Patent: Jul. 12, 2016

(54) OBJECT LOCATION USING A MOBILE DEVICE

(71) Applicants: Robert Edwin Sheets, Jr., Portland, OR (US); Catherine E. Korfanty, East Point, FL (US)

(72) Inventors: Robert Edwin Sheets, Jr., Portland, OR (US); Catherine E. Korfanty, East Point, FL (US)

( * ) Notice: Subject to any disclaimer, the term of this patent is extended or adjusted under 35 U.S.C. 154(b) by 0 days.

(21) Appl. No.: 14/735,252

(22) Filed: Jun. 10, 2015

(51) Int. Cl.
*G06K 9/00* (2006.01)
*G06K 9/62* (2006.01)
*G06K 9/60* (2006.01)
*G08B 6/00* (2006.01)

(52) U.S. Cl.
CPC .............. *G06K 9/6215* (2013.01); *G06K 9/605* (2013.01); *G08B 6/00* (2013.01)

(58) Field of Classification Search
None
See application file for complete search history.

(56) References Cited

U.S. PATENT DOCUMENTS

| | | | | |
|---|---|---|---|---|
| 6,803,887 B1* | 10/2004 | Lauper | .................... | G06F 3/013 345/7 |
| 7,126,558 B1* | 10/2006 | Dempski | .............. | G02B 27/017 345/8 |
| 9,147,174 B2* | 9/2015 | Glickman | .............. | G06K 9/209 |
| 2010/0121482 A1* | 5/2010 | Jackson | ............... | G06Q 10/087 700/217 |
| 2011/0071675 A1* | 3/2011 | Wells | ................... | G06K 9/3216 700/250 |
| 2012/0075343 A1* | 3/2012 | Chen | ..................... | G09G 5/397 345/633 |

* cited by examiner

*Primary Examiner* — Wesley Tucker
(74) *Attorney, Agent, or Firm* — Cygnet IP Law, P.A.; Stephen W. Aycock, II (57) ABSTRACT

Methods, systems and computer readable media for object location using a mobile device are described. The method can include obtaining, at a mobile device, information about a missing object and obtaining, at the mobile device, information about a background surface. The method can also include detecting, using a motion sensor in the mobile device, movement of the mobile device, and acquiring, using one or more image sensors coupled to a processor in the mobile device, one or more images. The method can further include processing the one or more images to detect any candidate objects having a similarity within a given threshold to the missing object.

20 Claims, 6 Drawing Sheets

OBJECT LOCATION USING A MOBILE DEVICE

TECHNICAL FIELD

Embodiments relate generally to object location using machine vision, and more particularly, to methods, systems and computer readable media for object location using a mobile device.

BACKGROUND

Objects, especially small objects, can be dropped or misplaced and may be difficult to locate via naked eyesight. This difficulty may be exacerbated by eye disease. Small objects such as pills, screws, bolts, nuts or other small items may be easily overlooked by the naked eye when sitting on a surface having a pattern or other surrounding objects that may tend to make the object less apparent. Artificial surfaces such as tile flooring, carpet, slate flooring, stone flooring, marble flooring or the like may present a challenge in locating a dropped or misplaced object with the naked eye. Natural surfaces such as grass, dirt, rocks and the like may also present challenges in locating a dropped or misplaced object with the naked eye.

Embodiments were conceived in light of the above mentioned needs, problems and/or limitations, among other things.

SUMMARY

One or more embodiments can include methods, systems and computer readable media for object location using a mobile device.

Some implementations can include a method comprising obtaining, at a mobile device, information about a missing object and obtaining, at the mobile device, information about a background surface. The method can also include detecting, using a motion sensor in the mobile device, movement of the mobile device, and acquiring, using one or more image sensors coupled to a processor in the mobile device, one or more images. The method can further include processing the one or more images to detect any candidate objects having a similarity within a given threshold to the missing object.

The method can also include when a candidate object is detected, providing an alert via the mobile device that a candidate object has been detected, and receiving, via the mobile device, an indication of whether the candidate object is an image of the missing object. The method can further include when the indication is that the candidate object is an image of the missing object, stopping the acquiring and processing, and when the indication is that the candidate object is not an image of the missing object, continuing the acquiring and processing.

Some implementations can include a system for object location. The system can include a mobile device having a user input device, a motion sensor, one or more image sensors, a display device, a memory device; and one or more processors coupled to the user input device, the motion sensor, the one or more image sensors, the display device and the memory device, the processor configured, via instructions stored in the memory device, to perform operations.

The operations can include obtaining information about a missing object, and obtaining information about a background surface. The operations can also include detecting, using the motion sensor, movement of the mobile device, and acquiring, using one or more image sensors coupled to a processor in the mobile device, one or more images. The operations can further include processing the one or more images to detect any candidate objects having a similarity within a given threshold to the missing object, and when a candidate object is detected, providing an alert via the mobile device that a candidate object has been detected.

The operations can also include receiving, via the mobile device, an indication of whether the candidate object is an image of the missing object. The operations can further include when the indication is that the candidate object is an image of the missing object, stopping the acquiring and processing, and when the indication is that the candidate object is not an image of the missing object, continuing the acquiring and processing.

Some implementations can include a nontransitory computer readable medium having stored thereon software instructions that, when executed by a processor, cause the processor to perform operations. The operations can include obtaining information about a missing object, and obtaining information about a background surface. The operations can also include detecting, using the motion sensor, movement of the mobile device, and acquiring, using one or more image sensors coupled to a processor in the mobile device, one or more images. The operations can further include processing the one or more images to detect any candidate objects having a similarity within a given threshold to the missing object, and when a candidate object is detected, providing an alert via the mobile device that a candidate object has been detected.

The operations can also include receiving, via the mobile device, an indication of whether the candidate object is an image of the missing object. The operations can further include when the indication is that the candidate object is an image of the missing object, stopping the acquiring and processing, and when the indication is that the candidate object is not an image of the missing object, continuing the acquiring and processing.

In any of the above implementations, obtaining information about a missing object can include acquiring an image of a reference object similar to the missing object. Obtaining information about a missing object can include obtaining one or more of a size of the missing object, a shape of the missing object, a color of the missing object, and a type of material of the missing object.

Obtaining information about a background surface can include acquiring an image of the background surface. Obtaining information about a background surface can include receiving a selection of a type of background surface.

The one or more image sensors can include one or more of a camera image sensor configured to sense visible light, an infrared sensor, and an ultraviolet sensor. Processing the images can include performing an object recognition process on the one or more images. Providing an alert can include one or more of providing a visual alert on a display device of the mobile device, providing an audible alert via an audio output device of the mobile device and providing haptic feedback via a haptic output device of the mobile device.

DETAILED DESCRIPTION

It will be appreciated that "missing object" as used herein can refer to an object that has been dropped, misplaced and/or otherwise lost.

Figure 1:
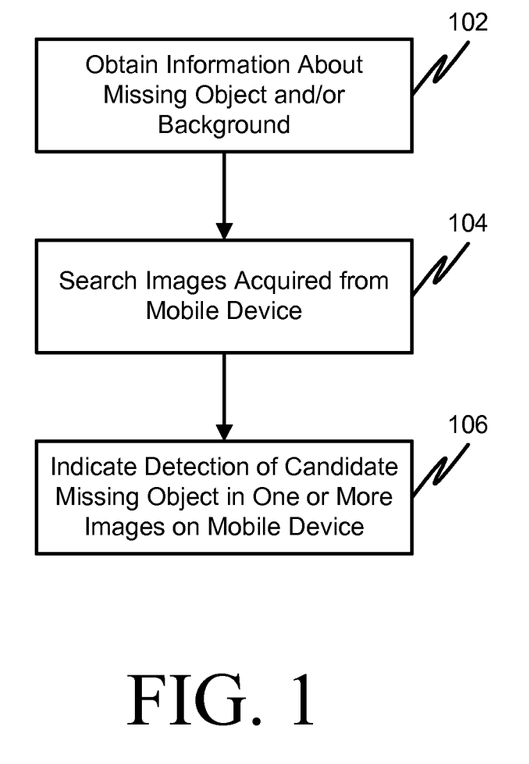
FIG. 1 is a flowchart of an example method for object location using a mobile device in accordance with at least one implementation.

FIG. 1 is a flowchart of an example method for object location using a mobile device in accordance with at least one implementation. Processing begins at 102, where information about a missing object and/or background is obtained. The information about the missing object can include a reference image of an object similar to (or the same as) the missing object. The information about the missing object can also include one or more features of the missing object such as size, shape, color, texture, type of material (e.g., metal, wood, plastic, etc.), and physical property (e.g., thermal conductivity, visible or thermal reflectance or absorption or the like).

Information about the background can include a reference image of the background surface. The information about the background can also (or alternatively) include a type of background (e.g., carpet, tile, stone, slate, marble, grass, rocks, etc.). Processing continues to 104.

At 104, images acquired from a mobile device are searched for the missing object. For example, a camera (or other sensor) of a mobile device can be used to acquire one or more images. The one or more images can be searched using a machine vision object recognition process. In addition to the one or more images, inputs to the machine vision object detection process can include the information about the missing object and/or the information about the background. Processing continues to 106.

At 106, when a candidate missing object is detected, an indication can be provided in one or more images on the mobile device. For example, if the machine vision object recognition process determines, within a given threshold, that a portion of the image matches the missing object, the image containing the image of the missing object can be displayed and graphical symbology indicating the location of the missing object in the image can be provided on a display of the mobile device. In addition to a graphical indication, an audible (via an audio device of the mobile device) and/or haptic indication (via a haptic or tactile feedback device of the mobile device, such as a vibration generator, can be used to provide the haptic indication) can be provided.

Figure 2:
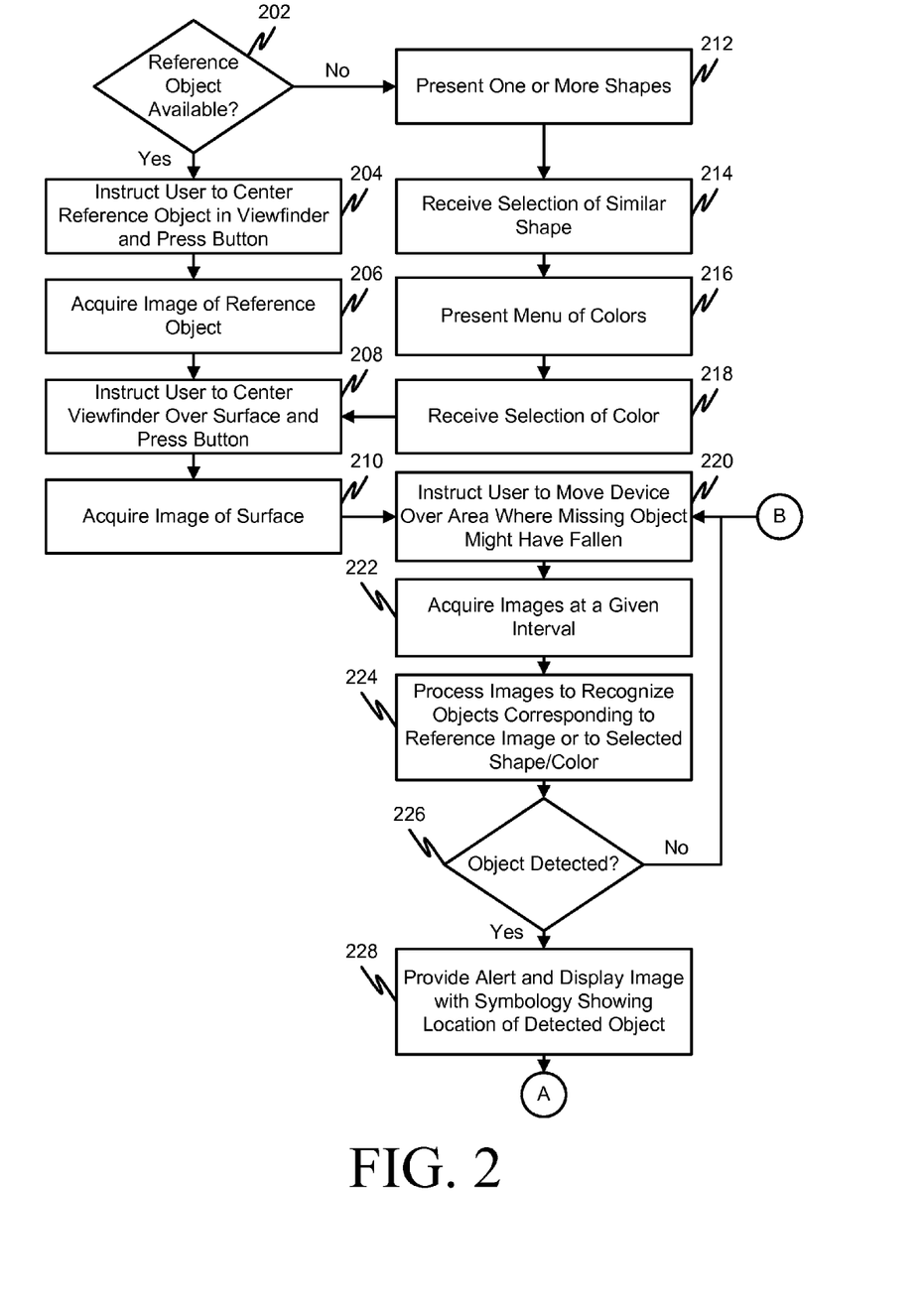
FIG. 2 is a flowchart of an example method for object location using a mobile device in accordance with at least one implementation.

FIG. 2 is a flowchart of an example method for object location using a mobile device in accordance with at least one implementation. Processing begins at 202, where it is determined whether a reference object is available that is similar to or the same as the missing object. If so, processing continues to 204. If not, processing continues to 212.

At 204, a user is instructed to center the reference object in a viewfinder of the mobile device and press a button (e.g., the button to take a picture). Processing continues to 206.

At 206, an image of the reference object is acquired. For example, the camera of the mobile device acquires an image of the reference object and passes the image (or a reference to the image) to the object location application executing on the mobile device. For example, if one earring is missing, the other non-missing earring could be used to obtain a reference image for searching for the missing earring. In another example, if a pill was dropped, another pill of the same type could be used to obtain the reference image. In another example implementation, the reference image could be obtained from images stored within the mobile device or obtained from an external source such as the Internet. Optionally, processing at 206 can include steps 212-218 to augment the reference image with information relating to selected features of the missing object. Processing continues to 208.

At 208, the user is instructed to center the mobile device viewfinder over the background surface and to press a button to acquire an image. This can be used to calibrate the object recognition process to a known background surface. Alternatively, if taking an image of the background is not desired or for some reason may not be helpful, the user may be given an option to select a background surface type. If a background image is being acquired, processing continues to 210. Otherwise processing continues to 220.

At 210, an image of a background surface is acquired. Processing continues to 220.

At 212, one or more shapes are presented (e.g., via a drop down list or other similar user interface element). In addition to, or as an alternative to, shapes, one or more of the following may be presented: size, texture, type of material (e.g., metal, wood, plastic, etc.), and physical property (e.g., thermal conductivity, visible or thermal reflectance or absorption or the like). Processing continues to 214.

At 214, a selection of a shape (and/or other property mentioned above) is received. Processing continues to 216.

At 216, a menu (or other similar user interface element) of colors is presented. Processing continues to 218.

At 218, a selection of a color is received (e.g., via a user interface device of a mobile device such as a touch screen). In addition to the shape and/or color, additional questions could be presented to the user to help further specify features of the missing object and to help narrow the search. Also, reference images and/or features (size, shape, color, etc.) of frequently dropped or misplaced items (e.g., regularly used medication pills, frequently worn jewelry, frequently used small parts, etc.) could be stored as a preset missing item, presented to a user as one or more "shortcuts" and selected by the user to streamline the process of initiating a search for a missing object. Processing continues to 220.

At 220, the user is instructed to move the mobile device over the area where the missing object may be (or is believed to be) located. For example, the user may be instructed to wave the device over the area to be searched with image sensor facing the area to be searched. Processing continues to 222.

At 222, one or more images are acquired of the area to be searched. The images can be acquired at a given interval of time (e.g., every 1 second) or location. For example, the images can be acquired based on estimated device position so as to capture images of the area to be searched while seeking to avoid or minimize duplicate images of the area. Processing continues to 224.

At 224, the acquired images can be processed to recognize any objects in the images that are similar to the missing object based on the reference image of the missing object and/or the selected features of the missing object. Any suitable machine vision object recognition technique can be used to locate the missing object in the acquired images of the search area. In particular, machine vision object recognition technique that can make use of reference images and/or missing object features can be used. Processing continues to 226.

AT 226, it is determined whether a candidate object is detected within the acquired images of the search area. If so, processing continues to 228. Otherwise processing continues to 220.

At 228, an alert is provided to the user indicating that a candidate missing object has been identified within one or more of the images of the acquired images of the search area. The alert can include visible symbology provided via a display device of the mobile device. The alert can also include one or more of audible alerts, haptic/tactile alerts, etc. Processing continues to 302 of FIG. 3.

Figure 3:
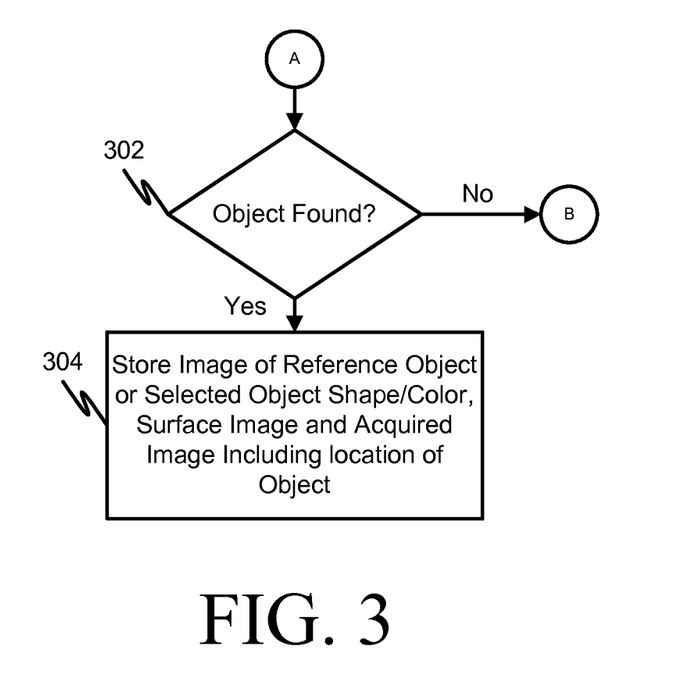
FIG. 3 is a flowchart showing a continuation of the flowchart of FIG. 2.

FIG. 3 is a flowchart showing a continuation of the flowchart of FIG. 2. At 302, it is determined whether the candidate image is an image of the missing object. For example, when a candidate image is determined, a user interface can be displayed that includes selections for confirming that the candidate image is an image of the missing object and that the candidate image is not an image of the missing object. Optionally, when the user indicates that the candidate object is not the missing object (e.g., that the system generated a false positive), for example by selecting an ignore/continue button on the user interface, the image of the candidate object can be excluded from future results by informing the machine vision object recognition system that the candidate image was not the missing object. If a user indicates that the candidate image is an image of the object, processing continues to 304. Otherwise, processing continues back to 220.

At 304, the image and/or features of the reference object are stored along with a background surface image or features and the acquired image of the search area with the candidate image location. This information can be stored and used to train the machine vision object detection system using unsupervised, semi-supervised or supervised learning techniques to help improve accuracy of future object recognition tasks.

It will be appreciated that 102-106 and 202-228, and 302-304 can be repeated in whole or in part in order to accomplish a contemplated object location task.

Figure 4:
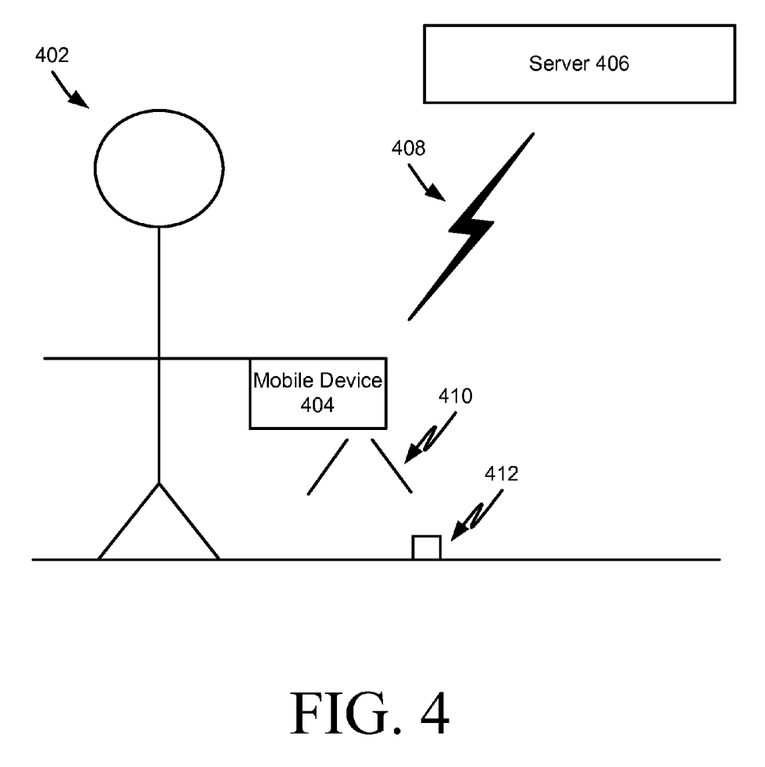
FIG. 4 is a diagram of an example environment showing operation of an implementation for object location using a mobile device in accordance with at least one implementation.

FIG. 4 is a diagram of an example environment showing operation of an implementation for object location using a mobile device in accordance with at least one implementation. A user 402 holds a mobile device 404 and moves the mobile device 404 over an area to search for a missing object 412 using one or more sensors 410 of the mobile device 404. The mobile device 404 can also communicate with a server 406 via a communication link 408 (e.g., WiFi wireless network or the like).

The one or more sensors 410 can include a thermal sensor attachment for a mobile device (e.g., those manufactured by FLIR). The one or more sensors 410 can include an infrared sensor and/or a sensor for other spectra. Thus, a missing object can be located based on sensing temperatures of objects on the background surface. An implementation could also be configured to locate a heat generating object or creature (such as a bed bug).

A thermal sensor image could be combined with a visible light image to produce a fused image having information from two or more spectra (e.g., visible light and infrared). In addition to object characteristics mentioned above such as shape and color, thermal conductivity of a missing object could be specified when using a thermal sensor to better guide the machine vision object recognition system in locating a missing object.

The object location machine vision object recognition processing could be performed within the mobile device 410, on a server 406 or across both the mobile device 404 and server 406. When using a server to process or help process images, a communication link 408 can be used to exchange data between the mobile device 404 and the server 406.

Figure 5A:
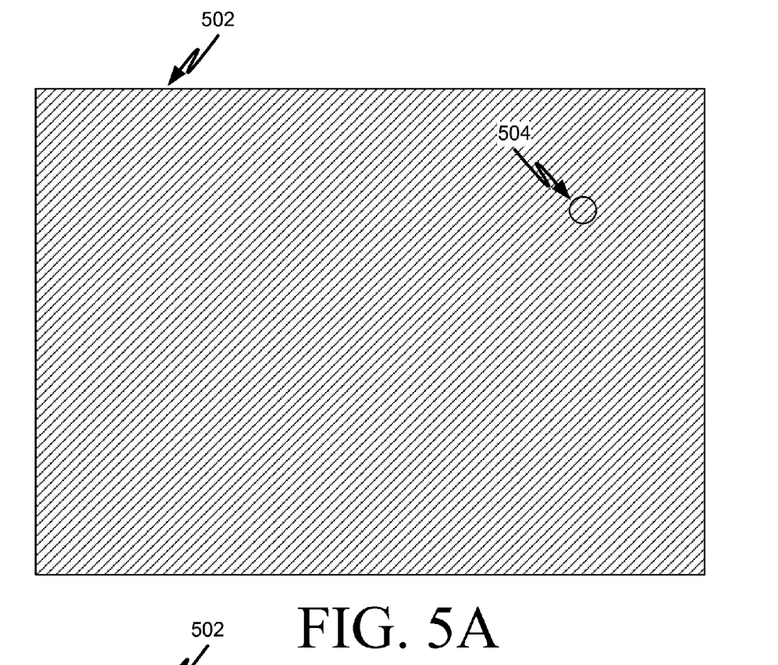
FIGS. 5A and 5B show example diagrams of images of object location using a mobile device in accordance with at least one implementation.
Figure 5B:
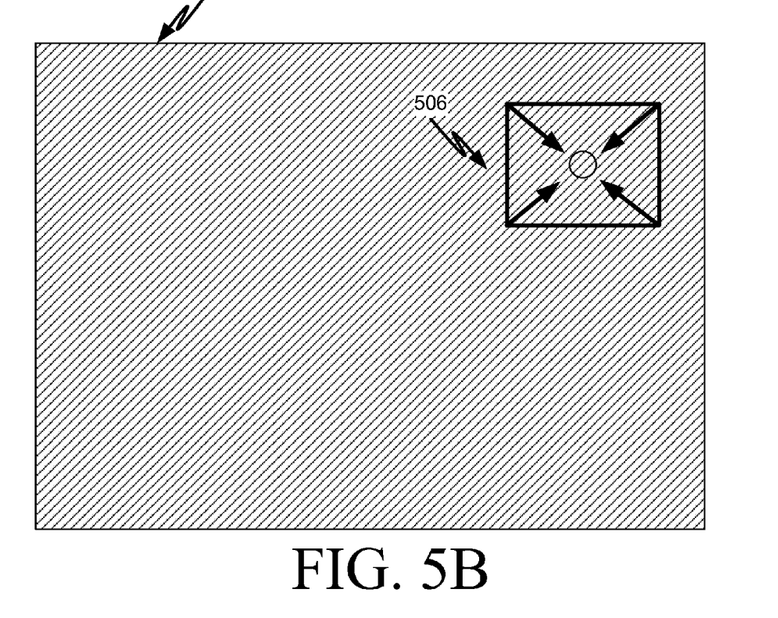

FIGS. 5A and 5B show example diagrams of images of object location using a mobile device in accordance with at least one implementation. As shown in FIG. 5A, a background surface 502 is present with a missing object 504 sitting on the background surface 502. A texture or pattern of the background surface 502 may make it difficult to see the missing object 504 with the naked eye.

After using an implementation of the mobile device object location system described herein, a resulting image may be similar to that shown in FIG. 5B in which symbology 506 has been added to the image to indicate to a user the location of the missing object 504. It will be appreciated that the symbology shown is one example for illustration purposes and that in a given implementation the symbology may be of various forms or designs.

Figure 6:
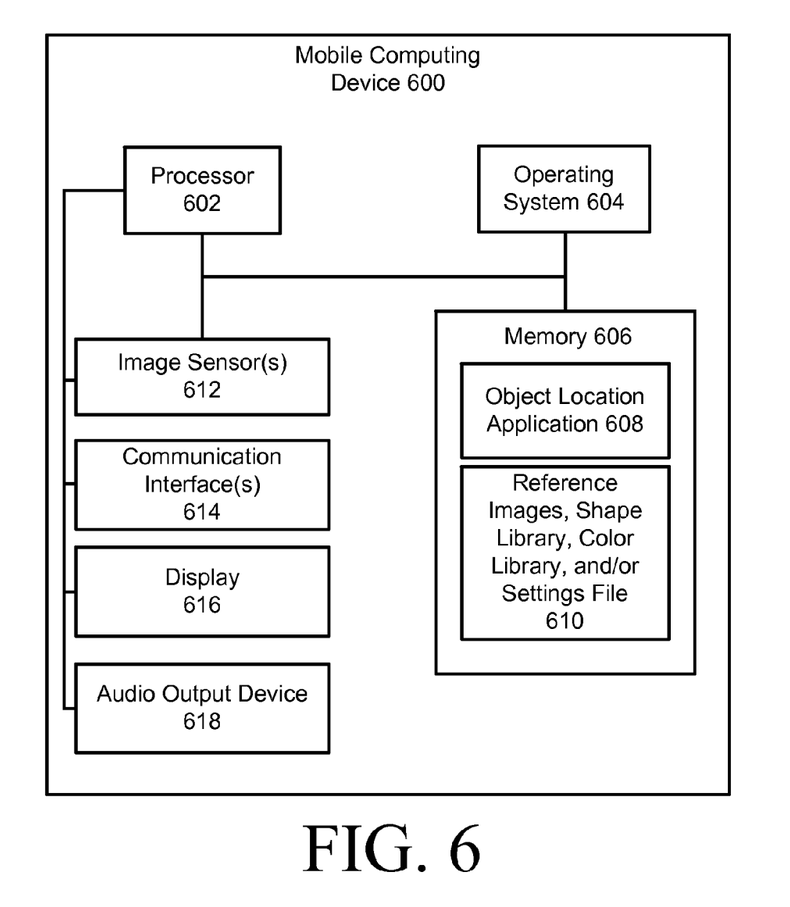
FIG. 6 is a diagram of an example mobile device configured for object location using a mobile device in accordance with at least one implementation.

FIG. 6 is a diagram of an example mobile device 600 configured for object location using a mobile device in accordance with at least one implementation. The mobile device 600 includes a processor 602, an operating system 604, a memory 606, an object location application 608, a database 610, one or more image sensors 612, one or more communication interfaces 614, a display device 616 and an audio output device 618.

In operation, the processor 602 may execute the application 608 stored in the memory 606. The application 608 can include software instructions that, when executed by the processor, cause the processor to perform operations for object location using a mobile device in accordance with the present disclosure (e.g., performing one or more of steps 102-106 and 202-228, and 302-304 described above in connection with FIGS. 1-3).

The application program 608 can operate in conjunction with stored data 610 (e.g., object reference images, shape (or other feature) library, color (or other feature) library, background images, background features, settings and the operating system 604.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their sub-components or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering, image processing and/or machine vision arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for object location using a mobile device.

While the disclosed subject matter has been described in conjunction with a number of embodiments, it is evident that many alternatives, modifications and variations would be, or are, apparent to those of ordinary skill in the applicable arts. Accordingly, Applicant intends to embrace all such alternatives, modifications, equivalents and variations that are within the spirit and scope of the disclosed subject matter.

What is claimed is:

1. A method for computerized object location comprising:
    obtaining, at a mobile device, information about a missing object, wherein the information about the missing object includes one or more of a reference image of an object similar to the missing object and one or more features of the missing object;
    obtaining, at the mobile device, information about a background surface, wherein the information about the background surface includes one or more of a reference image of the background surface and a type of background;
    detecting, using a motion sensor in the mobile device, movement of the mobile device;
    acquiring, using one or more image sensors coupled to a processor in the mobile device, one or more images;
    processing the one or more images to detect any candidate objects having a similarity within a given threshold to the missing object;
    when a candidate object is detected, providing an alert via the mobile device that a candidate object has been detected;
    receiving, via the mobile device, an indication of whether the candidate object is an image of the missing object;
    when the indication is that the candidate object is an image of the missing object, stopping the acquiring and processing; and
    when the indication is that the candidate object is not an image of the missing object, continuing the acquiring and processing.

2. The method of claim 1, wherein obtaining information about a missing object includes acquiring an image of a reference object similar to the missing object.

3. The method of claim 1, wherein obtaining information about a missing object includes obtaining one or more of a size of the missing object, a shape of the missing object, a color of the missing object, and a type of material of the missing object.

4. The method of claim 1, wherein obtaining information about a background surface includes acquiring an image of the background surface.

5. The method of claim 1, wherein obtaining information about a background surface includes receiving a selection of a type of background surface.

6. The method of claim 1, wherein the one or more image sensors includes one or more of a camera image sensor configured to sense visible light, an infrared sensor, and an ultraviolet sensor.

7. The method of claim 1, wherein processing the images includes performing an object recognition process on the one or more images.

8. The method of claim 1, wherein providing an alert includes one or more of providing a visual alert on a display device of the mobile device, providing an audible alert via an audio output device of the mobile device and providing haptic feedback via a haptic output device of the mobile device.

9. A system for object location comprising:
    a mobile device having:
        a user input device;
        a motion sensor;
        one or more image sensors;
        a display device;
        a memory device; and one or more processors coupled to the user input device, the motion sensor, the one or more image sensors, the display device and the memory device, the processor configured, via instructions stored in the memory device, to perform operations including:
obtaining information about a missing object, wherein the information about the missing object includes one or more of a reference image of an object similar to the missing object and one or more features of the missing object;
obtaining information about a background surface, wherein the information about the background surface includes one or more of a reference image of the background surface and a type of background;
detecting, using the motion sensor, movement of the mobile device;
acquiring, using one or more image sensors coupled to a processor in the mobile device, one or more images;
processing the one or more images to detect any candidate objects having a similarity within a given threshold to the missing object;
when a candidate object is detected, providing an alert via the mobile device that a candidate object has been detected;
receiving, via the mobile device, an indication of whether the candidate object is an image of the missing object;
when the indication is that the candidate object is an image of the missing object, stopping the acquiring and processing; and
when the indication is that the candidate object is not an image of the missing object, continuing the acquiring and processing.

10. The system of claim 9, wherein obtaining information about a missing object includes acquiring an image of a reference object similar to the missing object.

11. The system of claim 9, wherein obtaining information about a missing object includes obtaining one or more of a size of the missing object, a shape of the missing object, a color of the missing object, and a type of material of the missing object.

12. The system of claim 9, wherein obtaining information about a background surface includes acquiring an image of the background surface.

13. The system of claim 9, wherein obtaining information about a background surface includes receiving a selection of a type of background surface.

14. The system of claim 9, wherein the one or more image sensors includes one or more of a camera image sensor configured to sense visible light, an infrared sensor, and an ultraviolet sensor.

15. The system of claim 9, wherein processing the images includes performing an object recognition process on the one or more images.

16. The system of claim 9, wherein providing an alert includes one or more of providing a visual alert on a display device of the mobile device, providing an audible alert via an audio output device of the mobile device and providing haptic feedback via a haptic output device of the mobile device.

17. A nontransitory computer readable medium having stored thereon software instructions that, when executed by a processor, cause the processor to perform operations including:
obtaining, at a mobile device, information about a missing object, wherein the information about the missing object includes one or more of a reference image of an object similar to the missing object and one or more features of the missing object;
obtaining, at the mobile device, information about a background surface, wherein the information about the background surface includes one or more of a reference image of the background surface and a type of background;
detecting, using a motion sensor in the mobile device, movement of the mobile device;
acquiring, using one or more image sensors coupled to a processor in the mobile device, one or more images;
processing the one or more images to detect any candidate objects having a similarity within a given threshold to the missing object;
when a candidate object is detected, providing an alert via the mobile device that a candidate object has been detected;
receiving, via the mobile device, an indication of whether the candidate object is an image of the missing object;
when the indication is that the candidate object is an image of the missing object, stopping the acquiring and processing; and
when the indication is that the candidate object is not an image of the missing object, continuing the acquiring and processing.

18. The nontransitory computer readable medium of claim 17, wherein obtaining information about a missing object includes acquiring an image of a reference object similar to the missing object.

19. The nontransitory computer readable medium of claim 17, wherein obtaining information about a missing object includes obtaining one or more of a size of the missing object, a shape of the missing object, a color of the missing object, and a type of material of the missing object.

20. The nontransitory computer readable medium of claim 17, wherein providing an alert includes one or more of providing a visual alert on a display device of the mobile device, providing an audible alert via an audio output device of the mobile device and providing haptic feedback via a haptic output device of the mobile device.

* * * * *